United States Patent
Huang

[19]

[11] Patent Number: 6,023,311
[45] Date of Patent: Feb. 8, 2000

[54] LIQUID CRYSTAL DISPLAY DEVICE WITH A FREELY UPDATED REAR LINER PLATE

[76] Inventor: Rei-Chung Huang, 2F., No. 168, Section 2, Chung Shan Road, Yungho City, Taiwan

[21] Appl. No.: 09/256,749

[22] Filed: Feb. 24, 1999

[51] Int. Cl.[7] .......................... G02F 1/333; G02F 1/1335; G01D 11/28; F21V 7/04
[52] U.S. Cl. ................................ 349/58; 349/60; 349/65; 362/26; 362/31
[58] Field of Search ................................... 349/58, 60, 65, 349/64; 362/26, 31; 385/136, 137, 146, 147

*Primary Examiner*—William L. Sikes
*Assistant Examiner*—Joanne Kim
*Attorney, Agent, or Firm*—Pro-Techtor International Services

[57] ABSTRACT

A liquid crystal display (LCD) device with a freely updated rear liner plate. The bottom of the LCD panel is installed with a freely updated rear liner plate and a rear liner plate positioning means. A rear liner plate positioning means installed on the bottom of the LCD panel includes a rear liner plate inserting opening on the outer wall at one side of the case; a first positioning engaging portion; a second positioning engaging portion; an elastic element provided with an elastic force to eject the rear liner plate upwards; and a pressing mouth communicated with the second positioning engaging portion and the inserting opening of the rear liner plate. The rear liner plate is inserted from the inserting opening. By the first and second positioning engaging portions of the rear liner plate positioning means and the elastic element, the rear liner plate is fixedly secured to the bottom the LCD panel. Moreover, from the pressing mouth, the distal end of the rear liner plate is pressed so that the distal end moves downwards to the rear liner plate inserting opening, thus the rear liner plate is pulled out. The present invention further includes a light source installed between the LCD panel and the rear liner plate positioning means and on the inner wall above the first positioning engaging portion. As the light source emits light to the rear liner plate, then the light is reflected to the LCD panel for increasing the illumination.

14 Claims, 4 Drawing Sheets

LIQUID CRYSTAL DISPLAY DEVICE WITH A FREELY UPDATED REAR LINER PLATE

BACKGROUND OF THE INVENTION

1. Field of the Invention

The present invention relates to a liquid crystal display (LCD) device with a freely updated rear liner plate.

2. Description of the Prior Art

In the general used LCD device, a plain color-reflecting mask is adhered to the bottom of a LCD panel directly. The message to be displayed on the LCD panel is enhanced by the mask. In order to enhance the reflecting effect of a mask, or in order that the message displayed on the panel can be enhance in poor illumination (such as in a dark environment), a light source is further installed for compensating the reflecting screen radiation by light. However, this prior art often seems very dull because the background of the screen can not be updated. Furthermore, people often feel uneasy about the unchanged background. Especially, for a LCD device which is seen by users, such as electronic water, people often feel troublesome about this question.

SUMMARY OF THE INVENTION

Accordingly, the object of the present invention is to provide a liquid crystal display (LCD) device with a freely updated rear liner plate. The rear liner plate with different patterns can be easily updated according to the demand of a user. Thus, the LCD panel is beautified and has different background pattern.

Another object of the present invention is to provide a liquid crystal display (LCD) device with a freely updated rear liner plate. Not only the rear liner plate can be updated easily, but also an auxiliary light source is added for enhancing the reflecting effect of the screen so that the message on the LCD panel becomes clearer.

Accordingly, in the liquid crystal display (LCD) device with a freely updated rear liner plate of the present invention, the bottom of the LCD panel is installed with a freely updated rear liner plate and a rear liner plate positioning means, A transparent LCD panel is firmly fixed to the upper surface of the case;

A rear liner plate have an area larger than that of the LCD panel, and surface of the rear liner plate facing the LCD panel is formed with decorated pattern;

A rear liner plate positioning means installed on the bottom of the LCD panel includes following components:

A rear liner plate inserting opening on the outer wall of one side of the case;

A first positioning engaging portion in the inner wall opposite the inserting opening, the entering end the engaging portion have a sliding guide surface, thereby, the front end of the rear liner plate to be inserted may be guided successfully so as to engage with the positioning groove;

A second positioning engaging portion above the inner side of the inserting opening have a receiving space which is sufficient to receive the distal end of the rear liner plate;

An elastic element installed between the first and second positioning engaging portions is exactly positioned on the right bottom of the rear liner plate so to provide an elastic force to eject the rear liner plate upwards; and A pressing mouth downwards along the inserting opening of the rear liner plate is inclined inwards, the pressing mouth is hollowed and communicates with the second positioning engaging portion and the inserting opening of the rear liner plate;

The rear liner plate is nontransparent, and the surface of the pattern has a soft light dispersing effect and has a coarseness above $120 \times 10^{-6}$ mm.

As described above, at least the surface of the rear liner plate facing the LCD panel is installed with a decorating pattern. Of course, for the sake of cost, the upper and lower surfaces thereof are installed with different patterns. For example, the pattern may be designed according to the specification of the signal of the LCD panel, or it may be a light color pattern as a background, such as calendar, memo card, memory picture, etc.

Further, the rear liner plate is another LCD panel, and this another LCD panel is adhered with a nontransparent reflecting film on the bottom surface thereof.

Or the rear liner plate is a semitransparent body and a nontransparent reflecting film is adhered to the bottom surface of the rear liner plate.

Or a light dispersing film is adhered on the surface of the rear liner plate and the lower surface of the rear liner plate is adhered with a nontransparent reflecting film.

The elastic element is a rectangular sponge body or an elastic foaming body. Accordingly, the elastic element is a metal elastic piece, and the end of the elastic element facing the inserting opening has a guide surface inclined downwards, thereby, the rear liner plate can be inserted into easily.

The size of the rear liner plate inserting opening of the rear liner plate positioning means is slightly larger than the signal of the rear liner plate.

The second positioning engaging portion of the rear liner plate positioning means has an elevation higher than that of the first positioning engaging portion so that the installed rear liner plate is inclined upwards from the first positioning engaging portion toward the second positioning engaging portion.

A light source installed between the LCD panel and the rear liner plate positioning means and on the inner wall above the first positioning engaging portion;

The rear surface of the light source is installed with a reflecting surface for reflecting the light of the light source to the surface of the rear liner plate. Wherein is the reflecting surface of the light source is an inclined surface or an concave cambered surface.

Wherein, the rear liner plate is inserted from the inserting opening and by the first and second positioning engaging portions of the rear liner plate positioning means and the elastic element, the rear liner plate is fixedly secured to the bottom the LCD panel, moreover, from the pressing mouth, the distal end of the rear liner plate is pressed so that the distal end moves downwards to the rear liner plate inserting opening, thus the rear liner plate is pulled out.

The present invention will be better understood and its numerous objects and advantages will become apparent to those skilled in the art by referencing to the following drawings in which:

DETAILED DESCRIPTION OF THE PREFERRED EMBODIMENT

Figure 1:
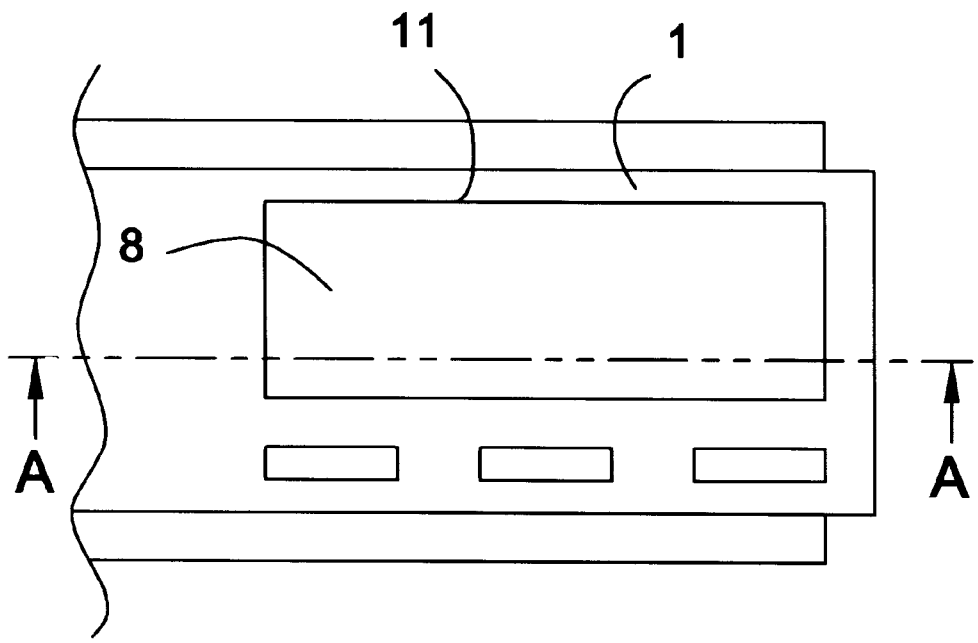
FIG. 1 is a perspective view showing an assembled LCD panel fixed to a case.
Figure 2:
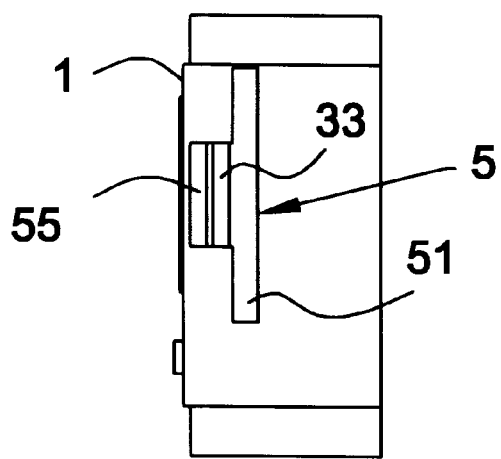
FIG. 2 is a right side view showing the structures of the rear liner plate inserting opening of the rear liner plate positioning means and the pressing opening.
Figure 3A:
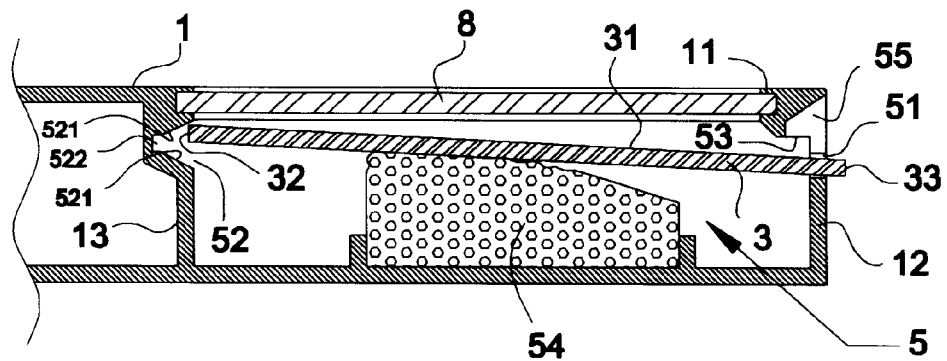
FIG. 3A is a cross sectional view along line A—A of FIG. 1 showing the process of a rear liner plate inserting into the rear liner plate positioning means.
Figure 3B:
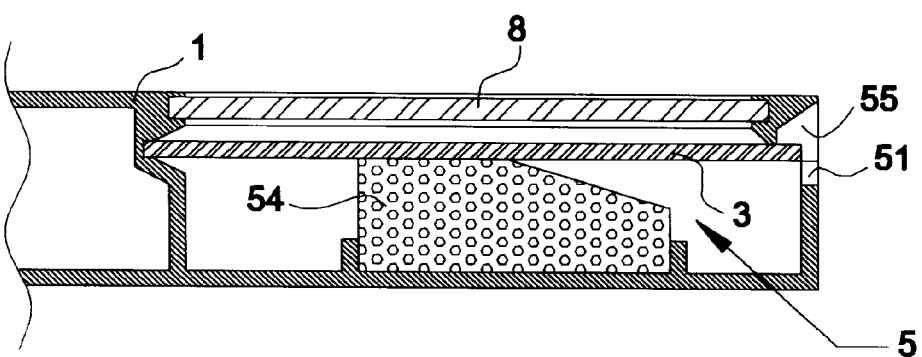
FIG. 3B is a cross sectional view along line A—A of FIG. 1 showing that a rear liner plate inserting into the rear liner plate positioning means is fixed therein.

As shown in FIGS. 1~3B, in the liquid crystal display (LCD) device of the present invention, a detachable rear liner plate 3 and a rear liner plate positioning device 5 are installed on the bottom of an LCD panel. The transparent LCD panel 8 is fixed to the uppermost surface of the case 1 by a frame 11. The area of the rear liner plate 3 is sufficient to shield the LCD panel 8. Namely, the area of the rear liner plate 3 is larger than that of the LCD panel. In this embodiment, the rear liner plate 3 is a nontransparent plate. The surface 31 toward the LCD panel 8 has a decorating pattern. In order that the pattern surface 31 of the rear liner plate will emit a soft light, the coarseness of the surface 31 is $120 \times 10^{-6}$ mm. The pattern of the rear liner plate 3 in the present invention is not confined. For example, the pattern may be designed according to the specification of the signal of the LCD panel 8, or it may be a light color pattern as a background, such as calendar, memo card, memory picture, etc.

The structure of the rear liner plate positioning device 5 has shown in detail, which is installed within the case 1 and positioned on the bottom of the LCD panel 8. The positioning device includes a rear liner plate inserting opening 51, and the opening is formed on the outer wall 12 on one side of the case 1. The size of inserting opening 51 is larger than opening of the rear liner plate 3. The first positioning engaging portion 52 is positioned on a wall 13 opposite to the inserting opening 51. The entering end thereof has a sliding guide slope 521 for guiding the front end 32 of the inserted rear liner plate 3 so as to be engaged within a positioning groove 522. A second positioning engaging portion 53 is formed on the upper edge inside the inserting opening 51 and has a space sufficient to receive the distal end 33 of the rear liner plate 3. An elastic sponge body 54 is installed between the first and second positioning engaging portions 52 and 53 and on the exact bottom of the positioned rear liner plate 3 for providing the positioned rear liner plate 3 an upward elastic force; and a pressing mouth 55 downwards along the outer wall 12 above the rear liner plate inserting opening 51, hollowed downwards and communicated with the second engaging portion 53 and the rear liner plate inserting opening 51.

Accordingly, the rear liner plate 3 inserts into the rear liner plate inserting opening, when it attain the first positioning engaging portion 52, the front end 32 of the rear liner plate 3 is guided by the sliding inclined surface 521 so as to embed into the positioning groove 522. Further, when the rear liner plate 3 has been inserted to a limited position, the distal end 33 of the rear liner plate 3 is exactly passes through the inserting opening 51 and by the elastic force of the elastic sponge body 54, the rear liner plate 3 move upwards to exactly eject into the second positioning engaging portion 53. Thereby, the rear liner plate 3 is steadily positioned in the bottom of the LCD panel 8, Then user only presses the distal end 33 of the rear liner plate 3 which is not protruded from the rear liner plate pressing opening 55 to cause the distal end 33 to move downwards to the inserting opening 51, then the rear liner plate can be pulled out successfully. Therefore, the rear liner plate 3 of the present invention can be easily assembled and updated.

Figure 4:
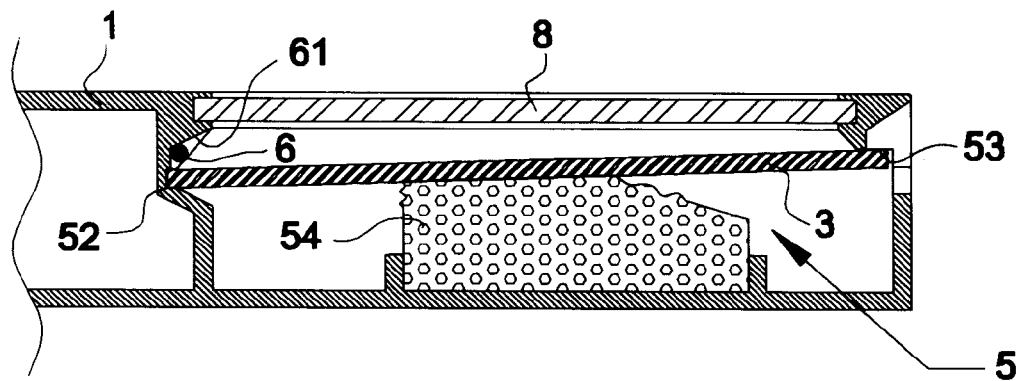
FIG. 4 is a cross sectional view of the second embodiment of the present invention, especially showing a light source installed between the LCD panel and the rear liner plate positioning means.

Now referring to FIG. 4, another embodiment of the present invention is illustrate. As the structure disclosed in the aforementioned embodiment, a light source 6 is installed between the LCD panel 8 and the rear liner plate positioning structure 5 and is on the inner wall 13 above the first positioning engaging portion 52. The light source 6 emits light to project to the rear liner plate 3. By the reflecting light source of the rear liner plate 3, the message displayed on the LCD panel 8 becomes clearer. Similarly, the pattern on the rear liner plate 3 is further impressed and more beautiful. Another character of this embodiment is that the second positioning engaging portion 53 has a position higher than the first positioning engaging portion 52 so that after the rear liner plate has been installed, it will incline upwards from the first positioning engaging portion 52 toward the second positioning engaging portion 53, and thus most of the light projected from the light source 6 is deflected to the LCD panel 8 by the rear liner plate 3. Therefore, in this embodiment, a reflecting surface 61 is further installed on the rear surface of the light source 6. Thereby, most of the light emitted from the light source 6 may be projected to the rear liner plate 3 wherein the reflecting surface 61 is an inclined surface (or is a concave surface).

Figure 5:
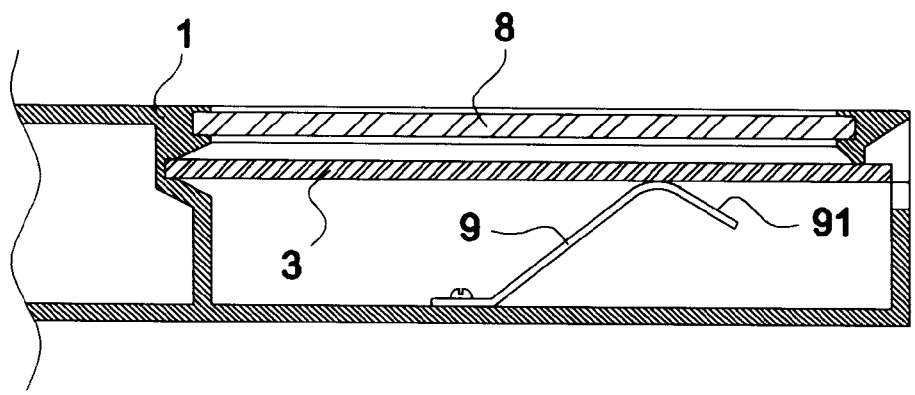
FIG. 5 is a cross sectional view of the present invention showing a metal elastic piece being used to replace the sponge body in FIG. 3B.
Figure 6:
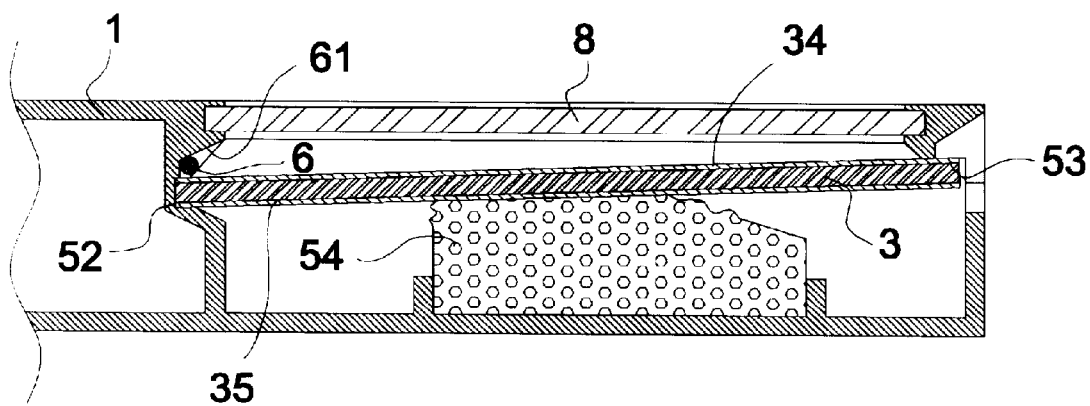
FIG. 6 is a cross sectional view of another embodiment of the present invention.

The present invention is not confined by the aforementioned structure, many modifications and variations can be made by those skilled in the art, which are within the spirit and scope of the present invention as shown in FIG. 6. For example, in order to save more cost, the upper and lower surfaces of the rear liner plate 3 are formed with different patterns. In order to form a background with dynamic variations, a LCD panel with a nontransparent reflecting film serves as a rear liner plate 3. In order to improve the softness of the rear liner plate 3, a nontransparent reflecting film 35 is adhered to the bottom of the rear liner plate 3, or a light dispersing film 34 is adhered to the surface thereof Furthermore, as shown in FIG. 5, in order to increase the elastic force, the elastic sponge body 54 can be changed by a metal elastic piece 9 and the end of the elastic piece 9 facing the rear liner plate inserting opening 51 has a guide surface 91 inclined downwards so that the rear liner plate 3 can be inserted easily.

Although the present invention has been described using specified embodiment, the examples are meant to be illustrative and not restrictive. It is clear that many other variations would be possible without departing from the basic approach, demonstrated in the present invention.

What is claimed is:

1. A liquid crystal display (LCD) device with a freely updated rear liner plate comprising:

a transparent LCD panel firmly fixed to upper surface of the case;

a rear liner plate having an area larger than that of the LCD panel, and surface of the rear liner plate facing the LCD panel being formed with decorated pattern;

a rear liner plate positioning means installed on a bottom of the LCD panel including:

a rear liner plate inserting opening on outer wall of one side of the case;

a first positioning engaging portion in inner wall opposite the inserting opening, an entering end the engaging portion having sliding guide surface, thereby, a front end of the rear liner plate to be inserted being guided successfully so as to engage with a positioning groove;

a second positioning engaging portion above the inner side of the inserting opening and having a receiving space which is sufficient to receive a distal end of the rear liner plate;

an elastic element installed between the first and second positioning engaging portions and exactly positioned on exact bottom of the rear liner plate so to provide an elastic force to eject the rear liner plate upwards; and a downward pressing mouth along the inserting opening and inclined inwards, the pressing mouth being hollowed and communicated with the second positioning engaging portion and the rear liner plate inserting opening;

a light source installed between the LCD panel and the rear liner plate positioning means and on the inner wall above the first positioning engaging portion;

wherein the rear liner plate being inserted into the inserting opening, by the first and second positioning engaging portions of the rear liner plate positioning means and the elastic element, the rear liner plate is fixedly secured to the bottom of the LCD panel, moreover, from the pressing mouth, the distal end of the rear liner plate is pressed so that the distal end moves downwards to the rear liner plate inserting opening, thus the rear liner plate is pulled out, while the light source emits light to the rear liner plate, and then the light is reflected to the LCD panel for increasing the illumination.

2. The liquid crystal display (LCD) device with a freely updated rear liner plate as claimed in claim 1, wherein the rear liner plate is nontransparent, and the surface of the pattern has a coarseness of $120 \times 10^{-6}$ mm.

3. The liquid crystal display (LCD) device with a freely updated rear liner plate as claimed in claim 1, wherein the rear liner plate is nontransparent, and the upper and lower surfaces thereof are installed with different patterns.

4. The liquid crystal display (LCD) device with a freely updated rear liner plate as claimed in claim 1, wherein the rear liner plate is another LCD panel, and this another LCD panel is adhered with a nontransparent reflecting film on bottom surface thereof.

5. The liquid crystal display (LCD) device with a freely updated rear liner plate as claimed in claim 1, wherein the rear liner plate is a semitransparent body and a nontransparent reflecting film is adhered to the bottom surface of the rear liner plate.

6. The liquid crystal display (LCD) device with a freely updated rear liner plate as claimed in claim 1, wherein a light dispersing film is adhered on the surface of the rear liner plate and a lower surface of the rear liner plate is adhered with a nontransparent reflecting film.

7. The liquid crystal display (LCD) device with a freely updated rear liner plate as claimed in claim 1, wherein the elastic element is a rectangular sponge body or an elastic foaming body.

8. The liquid crystal display (LCD) device with a freely updated rear liner plate as claimed in claim 1, wherein the elastic element is a metal elastic piece, and the end of the elastic element facing the inserting opening has a guide surface inclined downwards, thereby, the rear liner plate can be guided easily.

9. The liquid crystal display (LCD) device with a freely updated rear liner plate as claimed in claim 1, wherein the size of the rear liner plate inserting opening of the rear liner plate positioning means is slightly larger than the signal of the rear liner plate.

10. The liquid crystal display (LCD) device with a freely updated rear liner plate as claimed in claim 1, wherein the second positioning engaging portion of the rear liner plate positioning means has an elevation higher than that of the first positioning engaging portion so that the installed rear liner plate is inclined upwards from the first positioning engaging portion toward the second positioning engaging portion.

11. The liquid crystal display (LCD) device with a freely updated rear liner plate as claimed in claim 1, wherein the rear surface of the light source is installed with a reflecting surface for reflecting the light of the light source to the surface of the rear liner plate.

12. The liquid crystal display (LCD) device with a freely updated rear liner plate as claimed in claim 11, wherein is the reflecting surface of the light source is an inclined surface.

13. The liquid crystal display (LCD) device with a freely updated rear liner plate as claimed in claim 11, wherein the reflecting surface of the light source is a concave cambered surface.

14. A liquid crystal display (LCD) device with a freely updated rear liner plate wherein a bottom of LCD panel is installed with a freely updated rear liner plate and a rear liner plate positioning means, wherein an area of the rear liner plate is larger than that of the LCD panel, and surface of the rear liner plate facing the LCD panel is formed with a decorated pattern; the rear liner plate positioning means including:

a rear liner plate inserting opening on outer wall of one side of a case;

a first positioning engaging portion in inner wall opposite the inserting opening, an entering end the engaging portion having sliding guide surface, thereby, a front end of the rear liner plate to be inserted being guided successfully so as to engage with a positioning groove;

a second positioning engaging portion above the inner side of the inserting opening and having a receiving space which is sufficient to receive a distal end of the rear liner plate;

an elastic element installed between the first and second positioning engaging portions and exactly positioned on exact bottom of the rear liner plate so as to provide an elastic force to eject the rear liner plate upwards; and a downward pressing mouth along the inserting opening and inclined inwards, the pressing mouth being hollowed and communicated with the second positioning engaging portion and the rear liner plate inserting;

wherein, the rear liner plate being inserted into the inserting opening, by the first and second positioning engaging portions of the rear liner plate positioning means and the elastic element, the rear liner plate is fixedly secured to the bottom of the LCD panel, moreover, from the pressing mouth, the distal end of the rear liner plate is pressed so that the distal end moves downwards to the rear liner plate inserting opening, thus, the rear liner plate is pulled out.

* * * * *